INVENTOR.
FRINK M. YOUNG

BY Kenway, Jenney,
Witter & Hildreth

ATTORNEYS

United States Patent Office 3,165,694
Patented Jan. 12, 1965

3,165,694
AVERAGE SIGNAL VALUE MEASURING MEANS USING STORAGE MEANS ALTERNATELY CONNECTED TO THE SIGNAL AND A D.C. MEASURING MEANS
Frink M. Young, Boston, Mass., assignor to Adage, Inc., Cambridge, Mass., a corporation of Massachusetts
Filed Aug. 30, 1960, Ser. No. 52,833
11 Claims. (Cl. 324—111)

This invention relates generally to apparatus for providing the average value of alternating current signals (herein termed translating apparatus) and more particularly it is concerned with improved apparatus for providing the average value of these signals with greater speed and accuracy than equipment previously available.

Heretofore most of the apparatus used to obtain a measure of the magnitude of an alternating current signal has relied upon two types of devices. Peak reading devices, a first type, suffer from the disadvantage that their accuracy is seriously impaired when noise or other extraneous signals are present. This follows from the fact that in peak reading devices, instantaneous amplitude values are taken to represent the magnitude of the signals and these may be subject to substantial variations depending upon the amount of noise present at the instant the amplitude is sensed.

The other widely used type of device for determining the magnitude of alternating current signals incorporates a rectifier to convert the alternating current signals into pulsating direct current signals, and a filter to obtain a direct voltage corresponding to the average value of the pulsating signals. The difficulty encountered with this type of device is that appreciable time may be required for it to react to changes in the magnitude of the alternating current signals. If the amount of ripple present has been reduced, by filtering, to a relatively low value as compared with the value of the average direct voltage this time is substantial. If the ripple is not small, then of course it becomes a problem to determine just what the average value is. This can be done with a peak reading device but as mentioned above, such a device is subject to the effects of noise and other extraneous signals. Also the amount of ripple present depends upon the frequency of the alternating current signals which imposes severe bandwidth limitations upon the apparatus if it is to be both accurate and fast acting.

The particular difficulties with circuits of the type described become apparent when it is attempted to use a single measuring instrument to measure a number of alternating current sources. If the translating circuit is switched with the measuring instrument, the switching speed is limited by the length of time required for the filter associated with the translator to come to a steady value. If faster switching speeds are desired, or necessary, the only alternative with apparatus heretofore available is to provide either an individual translation circuit for each source or a complex and expensive filter circuit. Modern digital voltage measuring devices respond rapidly to applied direct voltage signals and are often fed in time sequence from a number of sources. To permit these devices to also measure alternating voltage sources, and yet measure them accurately and at high speeds, a circuit capable of providing accurate average values of alternating current signals which responds rapidly to changes in applied alternating voltage is desired.

The primary object of the present invention, therefore, is to provide improved apparatus for translating alternating current signals into a form from which the magnitude of the signals can be readily determined.

A more specific object is to provide apparatus of the above-mentioned character which responds to changes in the magnitude of the alternating current signals of interest in a rapid manner and which is relatively insensitive to the effect of noise and other extraneous signals.

Another object of my invention is to provide highly accurate apparatus of this character which is not unduly complex.

A still further object of my invention is to provide alternating signal translating apparatus which is adapted to operate over a wide frequency range.

The present invention contemplates in effect the conversion of the alternating current signal into a direct voltage having a ripple component, and the determination of the instantaneous voltage amplitude at such times as the amplitude is equal to the average value of the voltage. In other words, it is the amplitude of the signal at the zero crossings of the ripple component that is derived for measurement purposes. This is accomplished by an arrangement of a rectifier with a signal storage medium, e.g., a condenser, such that the storage medium can both accumulate and release energy during alternate half cycles of the input signal. If there is an increase in the amplitude of the signal, then more energy is stored than is released until a steady state condition is reached when there is no net gain of energy. If the signal amplitude decreases then, of course, the opposite is true until a steady state condition is again reached. During the half cycles when the alternating signal source is not connected to the storage medium, the storage medium is effectively isolated from the source of signals so that no energy is then dissipated. A switching operation is carried out in synchronism with the input signals for this purpose. Only when the input signal is not connected to the storage medium is a determination made of the amount of energy stored, thereby providing an accurate measure of the magnitude of the input signals.

The novel features of the invention together with further objects and advantages thereof will become apparent from the following detailed description and the drawings to which it refers.

In the drawings:

FIG. 1 illustrates schematically an idealized form of the apparatus in accordance with the present invention;

FIGS. 2(a), (b) and (c) represent waveforms at points in the circuit of FIG. 1 and are inserted for purposes of explanation;

Figure 1:
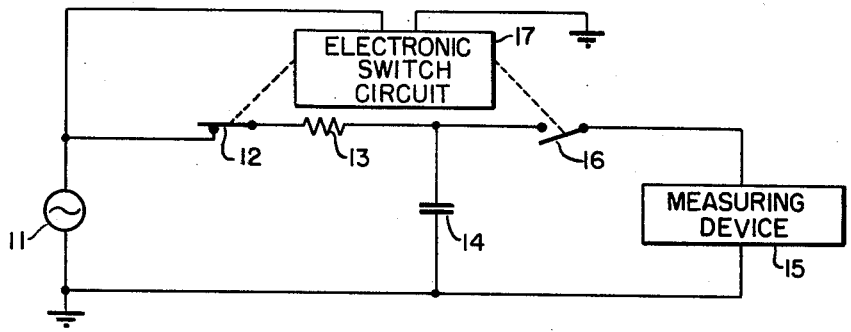

With reference first to FIG. 1 it will be observed that the numeral 11 designates the source of alternating current signals to be translated and that one side of the source is connected through a switching device 12 and a resistor 13 to one electrode of a capacitor 14 which has its other electrode connected to the ground. The load circuit comprises some form of utilization device such as a high input impedance measuring device 15 periodically connected across the capacitor 14 by a switch 16. As indicated by the dotted lines, the switches 12 and 16 are controlled by electronic means 17 to operate in synchronism with the alternating current signals from the source 11. The sense of the switch operation is opposite, however. That is, switch 16 is open while switch 12 is closed and vice versa.

In operation the capacitor, which in combination with the resistor perform the functions of a filter circuit, accumulates and releases charge during the alternate half cycles of the input signals when the switch 12 is closed. Specifically, during the initial portion of each half cycle while the signal amplitude is increasing, the capacitor will accumulate charge. Conversely, during the latter portion of each such alternate half cycle when the amplitude of the signal is decreasing, the capacitor necessarily loses some of its charge as soon as the instantaneous value of the input signal falls below the peak voltage value to which the capacitor has been charged during the initial portion of the half cycle. The net result, therefore, is that the capacitor at the end of each half cycle is left with an amount of charge which is dependent primarily upon the magnitude of the input signal. This value can be readily measured during the half cycles of the input voltage when the switch 12 opens and the switch 16 closes and is substantially equal to the average value of the alternating voltage when full wave rectified. At these times the capacitor is effectively open circuited and, so long as the measuring device has a high input impedance it holds its charge until once again it is coupled to the source and thereby adapted to reflect, according to its state of charge, any change in the magnitude of the input signals.

Figure 2:
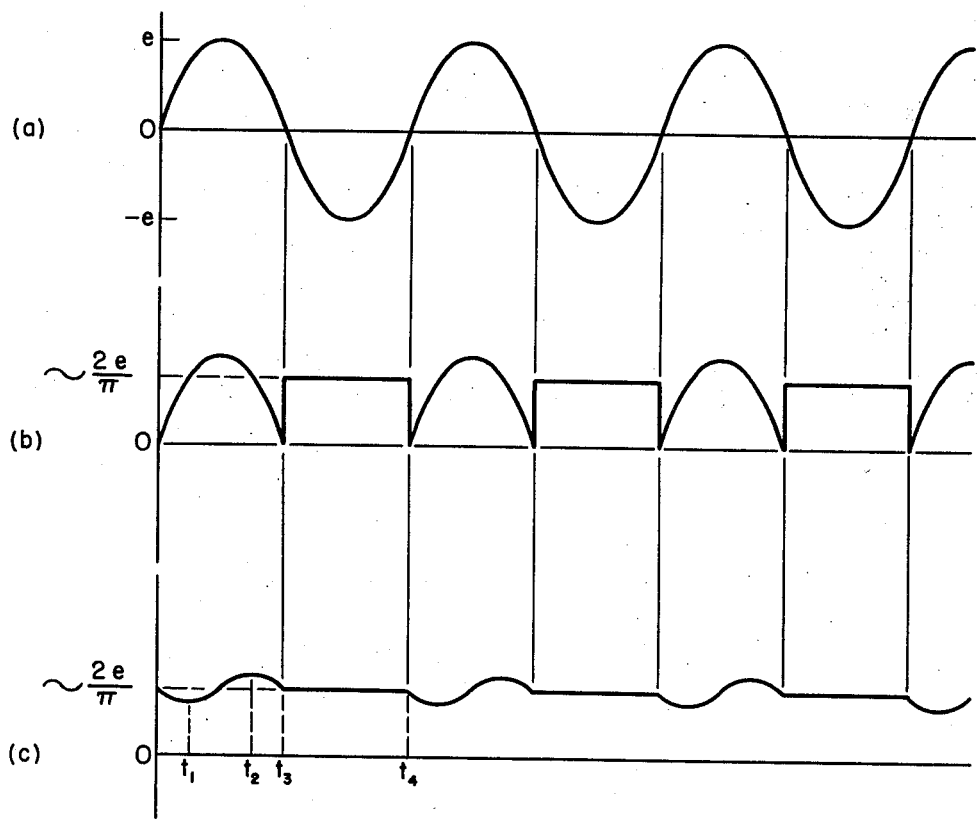

The foregoing discussion may be better understood by reference to FIG. 2. The waveform shown therein at (a) represents the voltage across the source 11. As shown it has a peak amplitude $e$. The waveform at (b) is the voltage between the end of resistor 13 which is connected to switch 12 and ground; the waveform at (c) is representative of the voltage across the condenser 14. The waveforms (b) and (c) are illustrated for a time when the translating circuit has reached a steady state condition.

In the steady state condition, except for a small error, the voltage across the condenser has the value $2e/\pi$ during the time when switch 12 is open. Thus when switch 12 first closes (and for purposes of the discussion it is assumed to be closed during positive half cycles of the source voltage) the voltage applied to the resistor 13 is lower than the voltage across condenser 14 and the condenser 14 therefore begins to discharge as explained above. Discharging continues until the rising source voltage equals the condenser voltage. This occurs at time $t_1$ in FIG. 2(c). Thereafter the condenser voltage begins to rise; this rise continues until the condenser voltage equals the decreasing source voltage. In FIG. 2(c) this occurs at time $t_2$. Thereafter the condenser voltage diminishes until the end of the cycle and switch 12 is opened at the end of the cycle, time $t_3$. Thereafter, for the remainder of the cycle the voltage across condenser 14 will be substantially constant until the beginning of the next cycle at time $t_4$.

If the amplitude of the voltage from the source 11 remains constant, in the steady state the condenser voltage at the beginning and end of each cycle will be the same. An analysis of the circuit, based on these conditions shows that the condenser voltage $E_0$ during half cycles when switch 12 is open, in the steady state is given by the equation:

$$E_0 \sim \frac{2e}{\pi}\left[1-\frac{12-\pi^2}{12}\frac{1}{(\omega RC)^2}\right]$$

where $\omega$ is the angular frequency of the source, R is the value of resistor 13 and C is the value of condenser 14. It will be observed that the $2e/\pi$ is the average value of a full wave rectified alternating voltage and that the negative term in the above equation represents an error in this voltage because the input signal is alternating.

If the value of the condenser or resistor is made large, the error term diminishes in accordance with conventional filter theory. However, increasing the value of either of these components increases the time constant of the filter and thus slows its response speed to changes in input voltage amplitude. However it will be observed that the angular frequency $\omega$, appears as $1/\omega^2$ in the error term. For a conventional RC filter supplied by a full wave rectified sine wave, the corresponding error term has the angular frequency as $1/\omega$. Thus, if a given percentage error is tolerable, the RC product of the filter useful with this invention may be much smaller than for a conventional averaging circuit with a corresponding increase in the speed of response. In particular I have found that, using the circuit of my invention, and with a permitted percentage error of 0.05 percent in the measured average value of the input voltage, my circuit reaches a steady state condition in about 40 cycles. By way of contrast, an RC filter supplied by a full wave rectified sine wave requires almost 1,000 cycles of the input voltage to reach a steady state condition, where only the same percentage error in measured average value is permitted.

The circuit of my invention as mentioned above may also be considered as a means for obtaining the average value of a rectified alternating voltage by sampling the voltage across the capacitor at a time when the ripple voltage has a minimum effect, i.e., at the zero crossing of the applied voltage which is for example time $t_4$ in FIG. 2.

In FIG. 2(b) I have illustrated the voltage waveform appearing at the left-hand end of resistor 13 in FIG. 1. As shown, for positive half cycles when switch 12 is closed it follows the input voltage exactly. When switch 12 is opened, the voltage goes immediately to the condenser voltage and remains there for the period of the next half cycle of the input voltage.

In this connection it is apparent that a series diode rectifier may not be used for the switch 12. Such a device would conduct only for that portion of the positive half cycle of applied voltage when the source voltage exceeded the condenser voltage, i.e., between times $t_1$ and $t_2$. Such an arrangement would not provide a measure of the average value of the applied alternating voltage.

Figure 3:
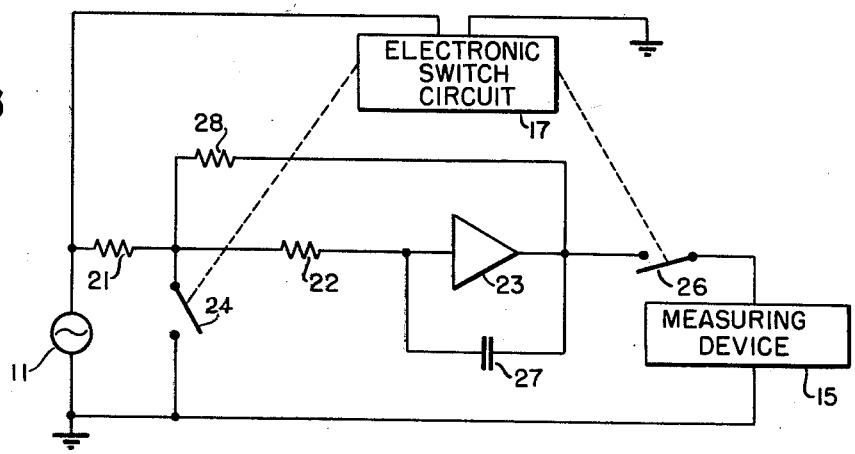
FIG. 3 illustrates schematically a preferred embodiment of the apparatus.
Figure 4:
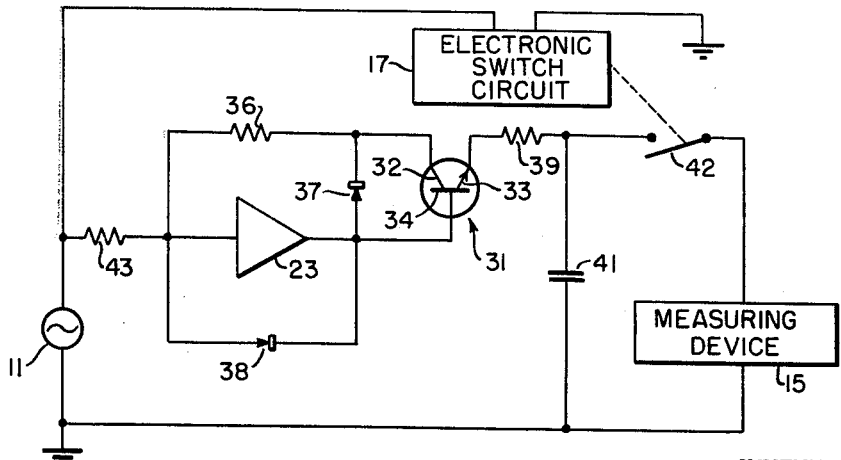
FIG. 4 illustrates another embodiment of apparatus made in accordance with the invention.

I have illustrated and explained my invention with respect to FIGS. 1 and 2. In FIGS. 3 and 4 two circuits are illustrated which I have found work well as specific embodiments of my invention.

In the preferred embodiment illustrated in FIG. 3 it will be observed that the same reference numeral 11 has been used to designate the source to which is coupled signal attenuating means in the form of a first resistor 21, and a second resistor 22. Resistor 22 in turn is connected to the input circuit of an operational amplifier 23 to which input signals from the source are applied during alternate half cycles. To this end, there is provided a switch 24 which is controlled to operate in synchronism with the input signals as in the case of the circuitry of FIG. 1. The electronic control circuit which again has been designated 17 also serves to actuate a switch 26 which periodically connects measuring device 15 to the output circuit of the amplifier. In contrast to the circuit of FIG. 1, switches 24 and 26 operate together, i.e., both are closed or both are open at the same time. It will be appreciated by those skilled in the art, however, that these switching functions may and preferably will be performed entirely by electronic means, conventional contact symbols having been used in the drawing merely to facilitate understanding the circuitry and its mode of operation. Completing the arrangement of FIG. 3 is a feedback circuit between the input and output circuits of the amplifier formed with a capacitor 27, and another feedback circuit formed with a resistor 28. Capacitor 27 and resistor 22 form the RC filter corresponding to resistor 13 and capacitor 14 of FIG. 1. Resistor 28 is connected between the output circuit of the amplifier and the junction of resistors 21 and 22.

In operation, during the half cycles when the switch 24 is open, the output voltage of the amplifier will necessarily follow the input signal waveform although it will be of opposite polarity. Since capacitor 27 is inside the feedback loop of the resistor 28, it has no effect on the amplifier operation during this period. In consequence, half sine waves or the like representative of the input signal are applied to the capacitor which is then adapted both to accumulate and release charge as in the case of the circuit of FIG. 1. When each such half cycle terminates, the amount of charge on the capacitor is thus representative of the magnitude of the input signal.

To measure this amount of charge, switches 24 and 26 close simultaneously, switch 24 serving effectively to bypass the input signals so that a zero voltage is present at the input to the operational amplifier which has the capacitor 27 as its feedback element. Under these circumstances, it will be recognized by those skilled in the art that the amplifier performs an integrating function to maintain the charge on the capacitor throughout the ensuing half cycle until once again the switch 24 is opened. The net result, therefore, is that the capacitor is capable of accumulating and releasing charge relatively easily in accordance with the magnitude of the input signals as described above and yet during alternate half cycles maintains its voltage relatively constant for measurement purposes. The measurements can be conveniently carried out by known sample and hold circuits synchronized, of course, to operate at the frequency of the input signals. Alternatively, two such circuits as those illustrated in FIG. 3 can be employed for alternate connection to the measuring device. In this way a continuous direct signal without any appreciable ripple whatever can be provided which is directly measurable by conventional means.

In FIG. 4 there is illustrated another embodiment of the invention which incorporates a transistor 31 having a collector 32, an emitter 33, and a base 34 the base-emitter circuit of the transistor serving as the switch 12 of FIG. 1. The control circuit of the transistor including the base and collector is connected between the output and input circuits of an amplifier 23 like that of FIG. 3. In series with the control circuit is a current limiting resistor 36 and in parallel with the control circuit is an asymmetrically conductive element 37 such as a semi-conductor diode. In this way a first feedback path is provided to the amplifier. Another semi-conductor diode 38 which can be similar to diode 37 is connected directly between the output and input circuits of the amplifier to form a second feedback path. As indicated, the polarity of the diode 38 with respect to the input circuit of the amplifier is opposite to that of diode 37.

The load circuit of the transistor comprising the base and emitter electrodes is coupled to a resistance input filter formed with a resistor 39 and a capacitor 41. A switch 42 controlled electronically as in FIG. 1 periodically connects the output of the filter to measuring device 15. Completing the circuit is a resistor 43 whereby the source 11 is connected to the input circuit of the amplifier.

In operation during the half cycles that diode 38 is effective to provide a low impedance feedback path, the capacitor 41 is effectively decoupled from the amplifier output circuit by virtue of the fact that the control circuit of the transistor is reverse biased and the switch 42 is closed to provide a voltage measurement. For the same reason, very little feedback is applied by way of the diode 37. During the remaining half cycles, when the feedback path formed with the diode 38 is effectively disabled, however, the transistor and the diode 37 come into play.

More particularly, the transistor is turned on by the feedback current flowing between the output and input circuits of the amplifier so that charge may be exchanged between the amplifier output and the capacitor. At the end of these half cycles, therefore, the capacitor attains a voltage value which is adapted to accurately reflect the magnitude of the input signal as discussed above. Diode 37 provides a low impedance path between the output and input circuits of the amplifier as soon as a small voltage is built up. As in the case of the preferred embodiment of FIG. 3 the voltage on the capacitor can be measured when the switch 42 is closed either by means of a conventional sample and hold circuit or by two such circuits which are adapted to be connected to the measuring device in alternating fashion.

It will thus be seen that I have provided a novel circuit for providing the average value of an alternating voltage signal. The circuit made according to my invention is much more rapid in response to changes in input signal amplitude for a given accuracy of measurement, or alternatively is substantially more accurate for a given speed of response than prior circuits. Additionally, I have disclosed two specific embodiments of practical circuits for utilizing the circuit of my invention.

As other embodiments and modifications thereof within the spirit and scope of the invention are of course possible, the invention should not be deemed to be limited to the details of what has been described herein by way of example. Rather it should be deemed to be limited only to the scope of the appended claims.

What is claimed is:

1. Apparatus for translating signals from a source of alternating current signals to obtain an indication of the magnitude of the signals, said apparatus comprising an amplifier having an input circuit and an output circuit, first switching means operating in synchronism with said signal source to apply the signals from said source to said input circuit during alternate half cycles of said signals, said switching means permitting current flow both to and from the input circuit during said alternate half cycles, a first feedback circuit coupled between said output circuit and said input circuit, said first feedback circuit having a substantially resistive impedance to enable said amplifier to reproduce the signals applied to said input circuit, a second feedback circuit coupled between said output circuit and said input circuit, said second feedback circuit having a substantially capacitive impedance to accumulate an amount of charge equivalent to the magnitude of said signals during said alternate half cycles and to hold said charge during the remaining half cycles of said alternating current signals, direct voltage measuring means, and a second switching means operating in synchronism with said signal source to provide a connection from said output circuit to said voltage measuring means during the remaining half cycles when said charge is held and means connecting one terminal of said signal source and said measuring means to a common reference potential.

2. Apparatus for translating signals from an alternating current signal source to obtain an indication of the magnitude of the signals, said apparatus comprising energy storage means to acquire and release electrical signal energy, impedance means interconnecting a first terminal of said signal source and a first terminal of said energy storage means, a first switching means connected to the signal source operating in synchronism with said source to apply the signals from said source to said energy storage means during alternate half cycles of said signals, said first switching means permitting current flow both into and from said storage means during said alternate half cycles, direct voltage measuring means, a second switching circuit means operating in synchronism with said signal source interconnecting said first terminal of said storage means and a first terminal of said measuring means during the remaining half cycles of said signals, and means providing a return path for electrical signals from the second terminals of said signal source, said energy storage means, and said measuring means to a common reference potential.

3. The apparatus defined in claim 2 wherein said first switching means is connected in parallel across the signal source to bypass the signals from said source to said common reference potential during said remaining half cycles.

4. Apparatus according to claim 1 wherein said first switching means is connected in parallel across the signal source to bypass the signals from said source to said common reference potential during said remaining half cycles.

5. Apparatus for translating signals from an alternating current source to obtain an indication of the magnitude of the signals, said apparatus comprising an amplifier having an input circuit coupled to said source and an output circuit, a first asymmetrically conductive feedback circuit polarized to conduct signals in a first direction coupled between said input and output circuits to enable said amplifier to reproduce said alternating current signals at its output circuit during alternate half cycles thereof, energy storage means to accumulate and to store signal energy, a second asymmetrically conductive feedback circuit including a resistor coupled between said input and output circuits and polarized to conduct signals of opposite polarity to said first feedback circuit to enable said amplifier to reproduce said signals during the remaining half cycles thereof, a transistor having a control circuit and a load circuit, the control circuit of said transistor being connected across a portion of said second feedback circuit, said energy storage means being connected in the load circuit of said transistor, whereby signal energy may be supplied to said energy storage means during alternate half cycles of said alternating current signal, said energy storage means being isolated from said signal source during the remaining half cycles, direct voltage measuring means, a switching circuit operating in synchronism with said source to provide a connection from said storage means to said direct voltage measuring means during the alternate half cycles when charge is stored in said storage means, and means providing a return path for electrical signals from said signal source, said energy storage means, and said measuring means to a common reference potential.

6. The combination defined in claim 5 in which said first and second feedback circuits include series connected diodes.

7. Apparatus for translating signals from an alternating current signal source to obtain an indication of the magnitude of the signals, said apparatus comprising in combination an amplifier having an input circuit and an output circuit, signal attenuating means having at least two terminals one of said terminals being connected to said input circuit, means connecting said source and the other terminal of said attenuating means, first switching means operating in synchronism with said signal source connected to the terminal of said attenuating means not connected to said amplifier to apply the signals from said source to said attenuating means during alternate half cycles of said signals, said switching means permitting current flow both to and from said attenuating means during said alternate half cycles, a resistive feedback circuit coupled between the output circuit of said amplifier and the junction of said switching means and said signal attenuating means to enable said amplifier to reproduce the signals applied to said input circuit, a capacitive feedback circuit coupled between the output circuit and the input circuit of said amplifier to accumulate an amount of charge representative of the magnitude of said signals and to hold said charge during the remaining half cycles of said signals, direct voltage measuring means, second switching means operating in synchronism with said signal source to connect the output circuit of said amplifier to said voltage measuring means during the remaining half cycles when the charge is held, and means connecting one side of said signal source and said measuring means to a common reference potential.

8. Apparatus for translating signals from an alternating current signal source to obtain an indication of the magnitude of the signals, said apparatus comprising an amplifier having an input circuit and an output circuit, a capacitor connected between said input and output circuits to acquire and release charge, impedance means connected between said signal source and said amplifier input circuit, a first switching means connected to the terminal of said impedance means not connected to said amplifier input terminal and operating in synchronism with said signal source to apply the signals from said source to said impedance means during alternate half cycles of said signals, said first switching means permitting current flow both into and from said capacitor during said alternate half cycles, direct voltage measuring means, a second switching circuit means operating in synchronism with said signal source, said second switching means interconnecting the terminal of said capacitor connected to the amplifier output circuit and said measuring means during the remaining half cycles of said signals, and means providing a return path for electrical signals from said signal source and said measuring means to a common reference potential.

9. The combination defined in claim 2 wherein said energy storage means includes a capacitor and said first switching means is connected in series with said impedance means and said source.

10. The apparatus defined in claim 8 in which said first switching means is connected in parallel with said signal source.

11. The apparatus defined in claim 7 wherein said first switching means is connected in parallel across the signal source to bypass the signals from said source to said common reference potential during said remaining half cycles.

References Cited in the file of this patent
UNITED STATES PATENTS

| | | |
|---|---|---|
| 2,607,528 | McWhirter | Aug. 19, 1952 |
| 2,843,736 | Huntley | July 15, 1958 |
| 2,937,329 | Esche | May 17, 1960 |
| 2,982,914 | Stewart | May 2, 1961 |